United States Patent Office 3,395,992
Patented Aug. 6, 1968

3,395,992
CONCENTRATION OF TRANSPLUTONIUM
ACTINIDES FROM DIRT SAMPLES
Kurt Wolfsberg and William R. Daniels, Los Alamos, N. Mex., assignors to the United States of America as represented by the United States Atomic Energy Commission
Filed Jan. 13, 1967, Ser. No. 609,732
1 Claim. (Cl. 23—338)

ABSTRACT OF THE DISCLOSURE

A method to concentrate the tripositive actinide elements produced in underground nuclear detonations in which the lanthanides and transplutonium actinides are extracted into tri-n-butylphosphate from large volumes of solutions of low acidity which are heavily salted with aluminum nitrate is described. The actinides and lanthanides are further extracted into di-2-ethylhexyl orthophosphoric acid and are recovered in an aqueous phase after esterification with decanol. A concentrated hydrochloric acid solution of the actinides and lanthanides is passed through an anion exchange resin column. The actinides are then separated from the lanthanides by elution from a cation exchange resin column with a solution of ethanol-hydrochloric acid. A separation between the transcurium actinides and americium and curium is made on this column.

---

The invention described herein was made in the course of, or under a contract with the U.S. Atomic Energy Commission.

The method of this invention is used with 250 gram samples of earth which has been exposed to radiation by an underground nuclear detonation and can be scaled up to handle samples in the range of several kilograms. Contamination problems have plagued all earlier attempts to separate the actinides produced by underground nuclear detonations. In particular, the sample size of earlier procedures was limited to the 25–50 gram range, and such procedures were highly inefficient methods of obtaining significant recoveries of the actinides. This invention solves this problem of handling irradiated earth samples without the hazards involved previously.

The process of this invention involves the lanthanides and transplutonium actinides being extracted into tri-n-butylphosphate (TBP) from large volumes of solutions of low acidity which are heavily salted with aluminum nitrate. Following extraction, the TBP is scrubbed with ammonium nitrate solution and the lanthanide and actinide elements are back-extracted into water. To keep the volumes of TBP and water reasonably small, a relatively small volume of TBP is repeatedly brought into contact with small volumes of feed solution which reduces the yield of the product by about 10%. The actinides and lanthanides are extracted into di-2-ethylhexyl orthophosphoric acid (HDEHP) from a solution of low acidity and are recovered in an aqueous phase after esterification of the HDEHP with decanol. Further decontamination is accomplished by passage of a concentrated hydrochloric acid solution of these elements through an anion exchange resin column. The actinides are then separated from the lanthanides by elution from a cation exchange resin column with an ethanol-hydrochloric acid solution. A separation between the transcurium actinides and americium-curium is made on this column. Although the procedure to be described in the preferred embodiment is written for samples weighing approximately 250 grams, the inventors have found that 2½ kilogram samples may be similarly processed without significant radiation hazard being encountered by using proportionately larger equipment and reagents.

It is therefore an object of this invention to provide a method of separating the transplutonium actinides from dirt samples obtained in a nuclear underground detonation and thus provide a process for obtaining the transplutonium actinides by a relatively inexpensive method. Other objects of this invention will be apparent from the description of the preferred embodiment.

A descrpition of the preferred embodiment of this invention follows:

The ground-up sample is dissolved in a mixture of concentrated $HNO_3$, $HClO_4$, and HF, and boiled to fumes of $HClO_4$. At least three more additions of HF are made, with boiling to fumes of $HClO_4$ after each addition. The solution is made 4 M in $HNO_3$, then 4 M in HF, and the insoluble fluorides (including the tripositive actinide fluorides) are filtered. The precipitate is washed twice with 4 M HF–4 M $HNO_3$, dissolved in concentrated $HClO_4$, and diluted to make approximately 1200 milliliter of a solution of 1–2 M in $HClO_4$.

Step 1

To the sample, add enough saturated $Al(NO_3)_3$ and 4 M LiOH to make the solution 1.7–1.9 M in $Al(NO_3)_3$ and about 0.1 M in $H^+$ (pH 1). For a 1200-milliliter sample, this is generally accomplished by starting with a 600-milliliter portion in each of two 4-liter bottles. To each bottle add about 2000 milliliter of saturated $Al(NO_3)_3$ and then 4 M LiOH slowly from a dispensing buret while stirring the solution vigorously. Stop the addition of LiOH when the indicated pH is 0.9 to 1.1 (usually about 300 milliliter of LiOH). Adjust the $Al(NO_3)_3$ concentration up to 1.7–1.9 M (about three-fourths saturated).

Step 2

Figure 1:
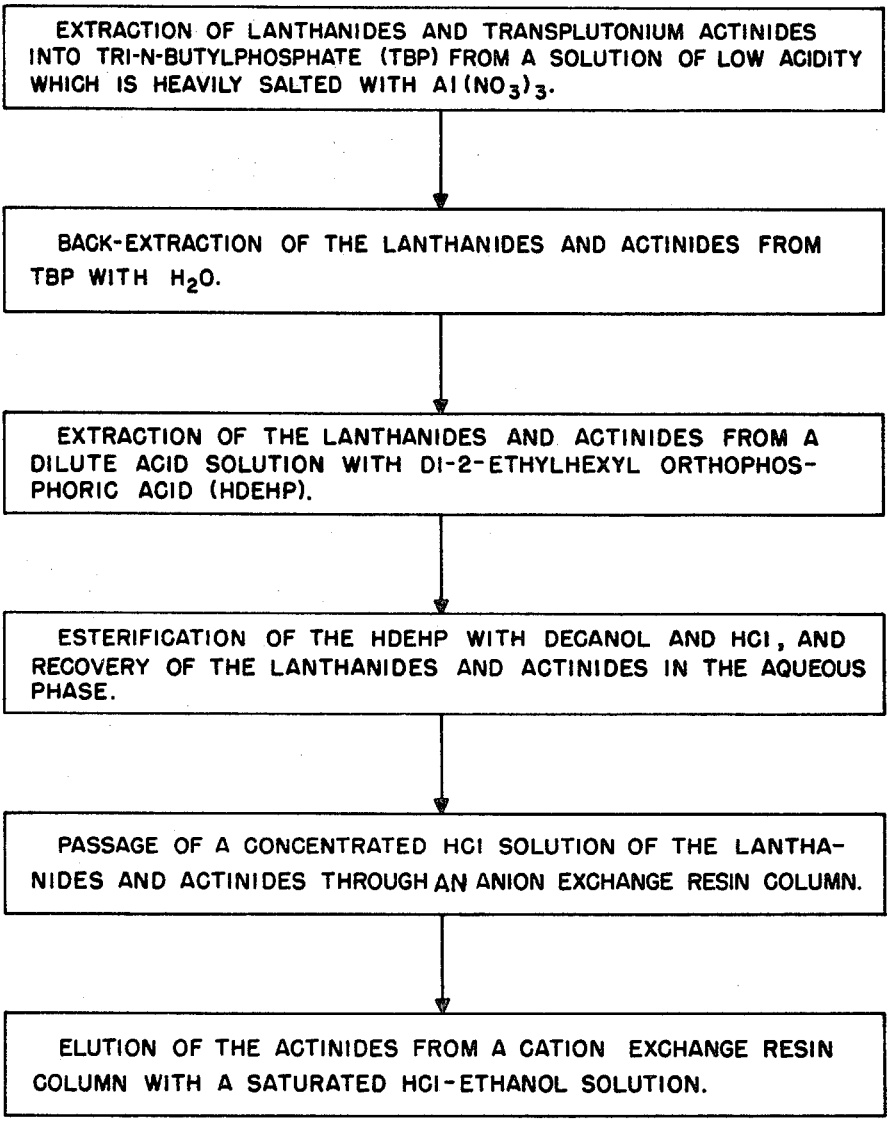
FIGURE 1 is a flow sheet which schematically shows the main steps of the procedure.
Figure 2:
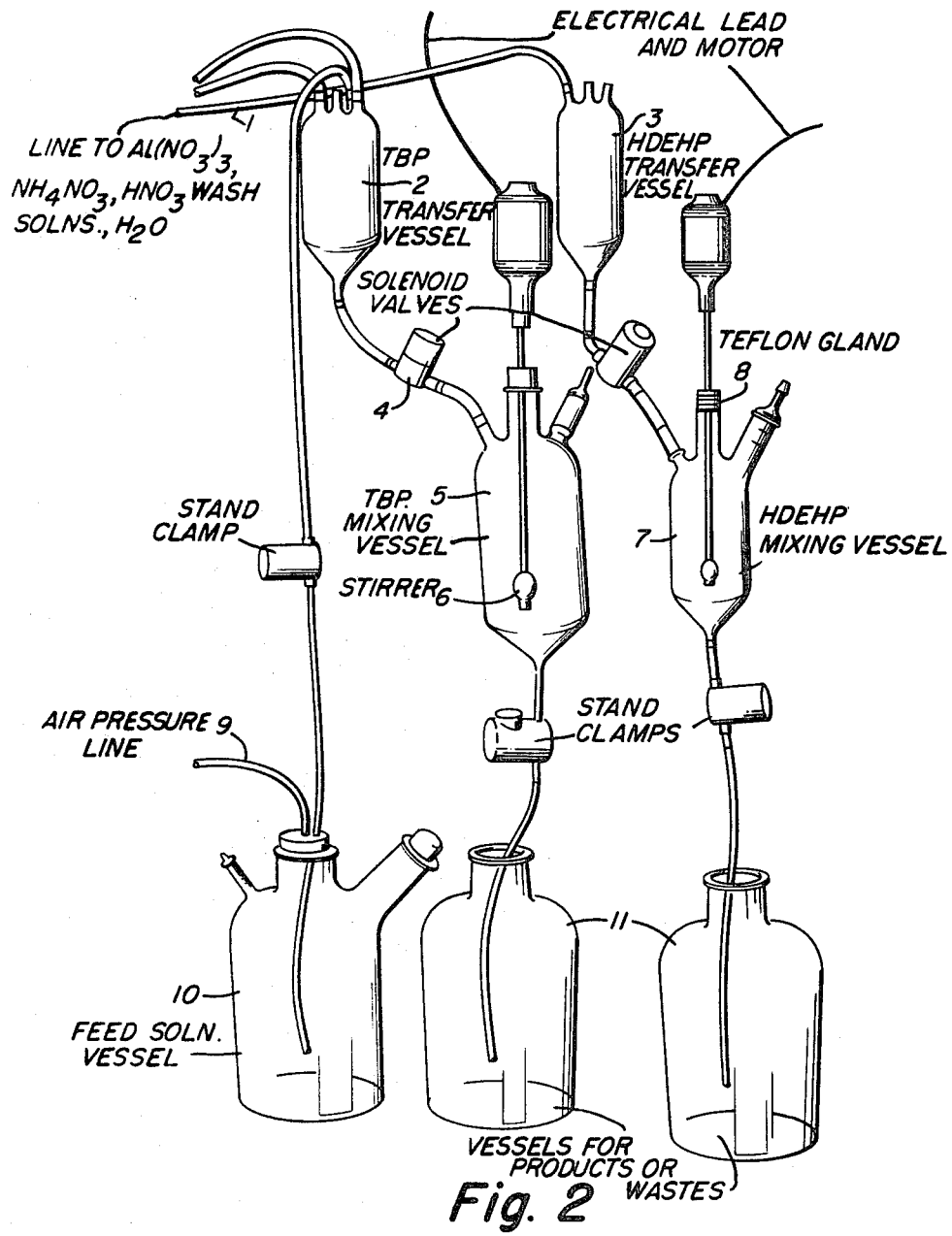
FIGURE 2 is a drawing of the extraction apparatus used in the preferred embodiment.

Pour 1 kilogram of TBP into the extraction vessel (see FIG. 2 for a picture of the extraction apparatus). Then add 500 milliliter of 1.9 M $Al(NO_3)_3$ and stir for 2 minutes. Draw off this preequilibrating $Al(NO_3)_3$ solution (the lower phase) and discard.

Step 3

By means of air pressure, force 500 milliliter of feed (the solution from Step 1) from a 4-liter bottle into the TBP transfer vessel. Drain the feed from the transfer vessel into the TBP in the extraction vessel. As soon as the addition of feed is begun, start the stirrer and continue stirring for 2 minutes. After the phases separate, drain the aqueous phase and discard. Repeat the procedure with successive 500-milliliter portions of feed; the total number of such contacts is not to exceed 18.

Step 4

Wash the TBP phase with one 500-milliliter portion of 1.9 M $Al(NO_3)_3$, stiring for 2 minutes, and then with five 500-milliliter portions of 10 M $NH_4NO_3$–0.2 M $HNO_3$, stirring for 5 minutes each time. Discard the washings.

Step 5

Back-extract the lanthanides and actinides with three 500-milliliter portions of $H_2O$, stirring for 2 minutes.

Step 6

Concentrate the back-extracted sample to about 200-milliliters by boiling in an appropriate glass vessel or by using a rotary flash evaporator with a water-cooled condenser. The concentration step should be terminated before any material comes out of solution. Pass the concentrated solution through a filter to remove any remaining TBP.

Step 7

To the concentrated solution, slowly add concentrated $NH_4OH$ until a pH of 1.5–1.75 is reached. Transfer the solution directly to the HDEHP extraction vessel, add 200 milliliters of 0.5 M HDEHP in heptane, and stir for about 2 minutes. After the phases separate, drain the aqueous phase and discard. Wash the HDEHP phase with three 200-milliliter portions of 0.05 M $HNO_3$ drained from the transfer vessel into the extraction vessel. Discard the washings.

Step 8

Drain the HDEHP phase into a 1-liter Erlenmeyer flask containing a magnetic stirring bar, and add 100 milliliter of decanol and 50 milliliters of concentrated HCl. Heat the flask on a stirrer-hot plate, and gently boil the mixture for 15 to 20 minutes.

Step 9

Pour the hot mixture into a separatory funnel. Drain the aqueous phase into a second separatory funnel. Scrub the organic phase with 25 milliliters of 6 M HCl, and add the aqueous phase to the second separatory funnel. Scrub the combined aqueous phase with about 10 milliliters heptane and discard the heptane. Boil the sample in an Erlenmeyer flask almost to dryness.

Step 10

Fill a glass column (see Special Equipment) with anion exchange resin and pretreat the resin with about 15–20 milliliter of 10 M HCl containing 2 drops of concentrated $HNO_3$. Dissolve the sample from Step 9 in 10 milliliter of concentrated HCl. Add 1 drop each of concentrated $HNO_3$, Te(IV) carrier, and Te(VI) carrier and warm gently. Pass the solution through the resin column (about 1 drop per second), collecting the eluate in an Erlenmeyer flask. Rinse the column twice with 5-milliliter portions of 10 M HCl containing 1 drop of concentrated $HNO_3$, collecting the eluates in the same flask.

Step 11

Boil the sample to 3–5 milliliter, dilute with $H_2O$ to about 20 milliliter, and transfer to a centrifuge tube. Make the solution basic with 6 M NaOH, centrifuge, and discard the supernate. Wash the precipitate with $H_2O$ and discard the wash. Dissolve the precipitate in 1–2 milliliter of concentrated HCl, dilute to about 20 milliliters with $H_2O$, and add a small amount of $NH_2OH \cdot HCl$. Warm the solution gently, make basic with concentrated $NH_4OH$, and centrifuge. Discard the supernate, wash the precipitate twice with $H_2O$, and discard the washes.

Step 12

Dissolve the precipitate in 3–5 drops of concentrated HCl and dilute to about 30 milliliters with $H_2O$. Add the equivalent of 2 milliliters of centrifuged cation exchange resin in water-slurry form, stir for 1 minute and centrifuge. Discard the supernate and wash the resin twice with $H_2O$.

Step 13

About 1 day prior to the next step, prepare the cation exchange column. Treat the cation exchange resin (a quantity equivalent to a resin volume of 25 milliliters when centrifuged from a slurry in $H_2O$) twice with 50 milliliter of concentrated HCl and three times with EtOH-HCl solution. This treatment is performed in a Buchner funnel with a medium frit, and the resin is sucked dry between treatments. Slurry the resin with EtOH-HCl, and transfer to a glass column for cation exchange, filling to a height of about 12.5 inches under 10 p.s.i. of air pressure. Pass EtOH-HCl through the column under 10 p.s.i. of pressure until the column is ready to be used. Just prior to use, reduce the height of the resin to 11¾ inches.

Step 14

Figure 3:
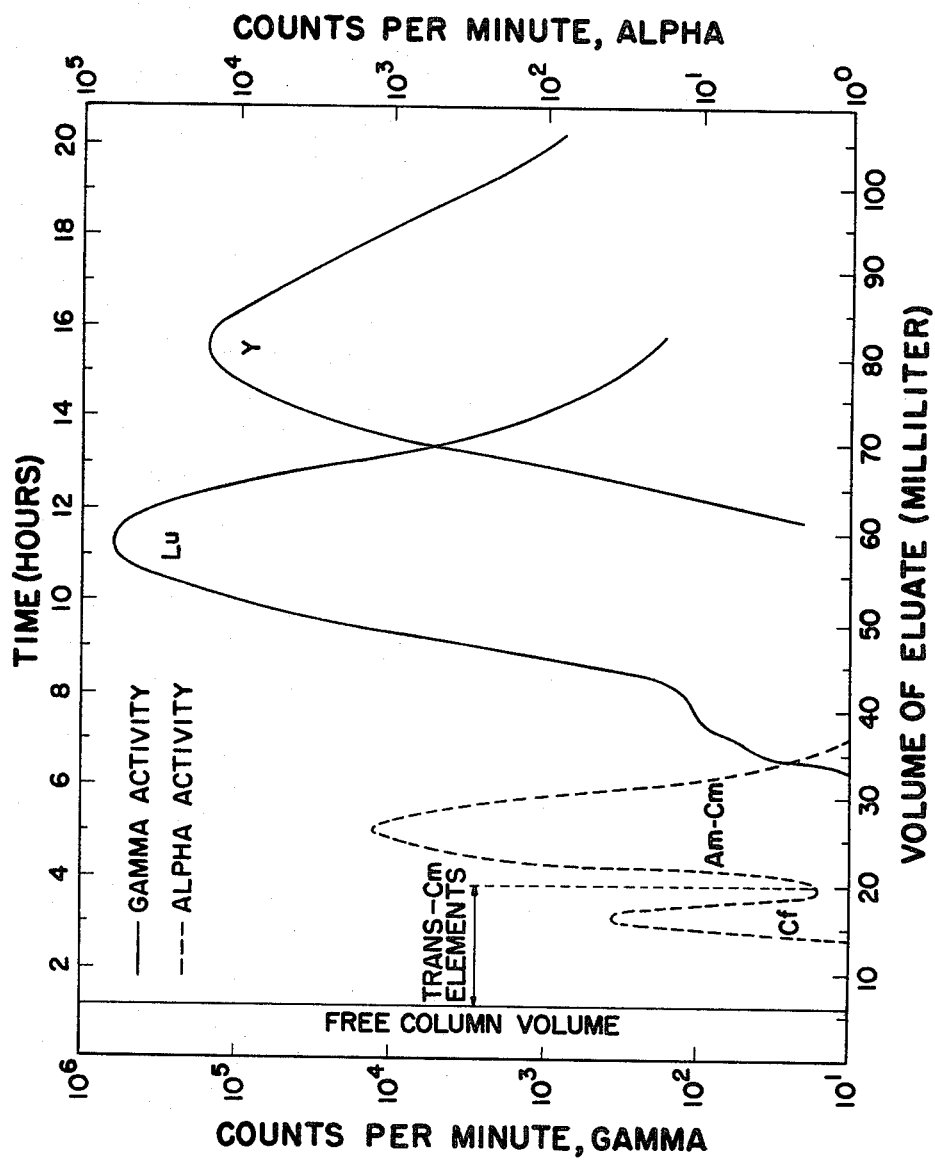
FIGURE 3 is the elution curve showing the separation of the transcurium actinides, americium-curium, and the lanthanides from the cation exchange resin column used in the process of this invention.

Slurry the resin from Step 12 in 1–2 milliliter of $H_2O$ and transfer to the top of the cation exchange column. Complete the transfer with a small $H_2O$ wash. Allow the resin to settle, draw off the $H_2O$, and insert a glass wool plug. Start eluting with EtOH-HCl under about 10 p.s.i. air pressure at a flow rate of about $0.1 \pm 0.015$ milliliter per minute. The elution curve shown in FIG. 3 is reproducible on a volume basis. The free column volume is about 6 milliliters. The valley between Cf and Am occurs between 18 and 21 milliliters, and the valley between Am-Cm (there is essentially no separation between these elements with the eluant used) and Lu occurs between 32 and 40 milliliters. Collect 10-minute fractions in an automatic fraction collector in calibrated tubes.

Step 15

Combine the desired fractions in a centrifuge tube and boil the solution almost to dryness. Add 2 milliliter of 0.05 M $HNO_3$ and heat if necessary to insure dissolution. Add 2 milliliters of 0.5 M HDEHP, stopper the tube, and shake for 2 minutes. Centrifuge briefly, and withdraw the aqueous (lower) phase and discard. Wash the organic phase with 2 milliliters of 0.05 M $HNO_3$ in a similar manner. Transfer the HDEHP to a 100-milliliter round-bottomed flask containing a magnetic stirring bar, add 1 milliliter of decanol, 1 milliliter of concentrated HCl, and boil and stir for 15 minutes. Add 0.5 milliliter of concentrated HCl several times to insure the presence of an aqueous phase. Transfer the mixture to a centrifuge tube, centrifuge, and transfer the aqueous phase to a new centrifuge tube. To the HDEHP phase add 1 milliliter of 6 M HCl and shake. Centrifuge, draw off the aqueous phase, and combine it with the previous aqueous phase. Scrub the combined aqueous phase with 2 milliliters of heptane, centrifuge, and transfer the aqueous phase to a quartz or Vycor vessel. Boil the sample to dryness. Add a few drops of concentrated $HNO_3$ and concentrated $HClO_4$, and fume the sample dry again.

At this point, there is generally no visible material present. If there is any residue, a further separation can be performed by the precipitation of the actinides with NaOH in the presence of Fe(III) carrier. The iron is then removed on a small anion exchange resin column by a procedure like that described in Step 10. Another possible purification can be accomplished by absorbing the actinides on a small Dowex 50 cation exchange resin column from a solution 0.1 M in HCl, washing with the same acid, and stripping with 6 M HCl.

To facilitate the understanding of Step 3 above, one could treat each contact as an individual organic-aqueous system with an apparent distribution coefficient, $K(o/a)$, between 20 and 40. With relative volumes of organic phase to aqueous phase of 2 to 1, between 97.5 and 98.8% of the actinides in the extraction vessel will be in the organic phase after each extraction. The following table shows how the overall yield would drop as a function of the number of extractions.

| Number of extractions | Percent Extracted | |
|---|---|---|
| | $K=40$ | $K=20$ |
| 1 | 99 | 98 |
| 5 | 96 | 93 |
| 10 | 94 | 87 |
| 15 | 91 | 82 |
| 20 | 88 | 78 |

In fact, the distribution coefficient probably changes with the number of contacts. The TBP becomes more viscous, and phase separation times increase with the number of contacts.

A value of 20–40 for the apparent K is probably fairly representative of Y. For Nd, the value is between 10 and 20. In general, the value of K (and recovery) varies in the order:

$$Nd < Eu \sim Am < Y \sim Tb \sim Cf < Fm$$

This difference might result in about a 10% fractionation of the actinides.

FIGURE 2 shows the TBP and the HDEHP extraction apparatus in which the lines to the aluminum nitrate, ammonium nitrate, and nitric acid wash solutions and also water are represented by 1; the TBP transfer vessel 2; the HDEHP transfer vessel 3; a typical solenoid valve 4; TBP mixing vessel 5; stainless steel centrifugal stirrer 6; HDEHP mixing vessel 7; Teflon gland 8; air pressure line 9; feed solution vessel 10; and vessels for receiving waste solutions or product 11.

SPECIAL EQUIPMENT

Extraction vessels (FIGURE 2): TBP vessels, 10 inches in length by 12.5 cm. O.D.; HDEHP vessel, 8 inches long by 9 cm. O.D.
Transfer vessels (FIGURE 2): TBP vessel, 8 inches long by 9 cm. O.D.; HDEHP vessel, 8 inches long by 7 cm. O.D.
Stainless steel centrifugal stirrers
Stirring motors
Teflon glands (source: Arthur F. Smith Co.)
Separatory funnels, with Teflon stopcocks
Bottles: 2 liter; 4 liter
pH meter with glass and calomel probes
Rotary flash evaporator, with a water-cooled condenser
Vacuum pump
Vinyl tubing
Teflon stopcocks
Solenoid valves
Switchbox for operating solenoid valves
Dispensing burets, with Teflon stopcocks
Glass columns for anion exchange resin: 8 cm. long by 10 mm. O.D.
Glass columns for cation exchange resin: 15 inches long by 9 mm. O.D.; with standard taper joint at top
Glass wool: used as plugs in all columns

SPECIAL REAGENTS USED IN PREFERRED EMBODIMENT

Saturated $Al(NO_3)_3$: Dissolve 5 lbs. of $Al(NO_3)_3 \cdot 9H_2O$ in 1050 milliliters of $H_2O$ to produce 2400 milliliters of solution. Heating speeds up the solution process
1.9 M $Al(NO_3)_3$: 3 parts by volume of saturated $Al(NO_3)_3$ and 1 part of $H_2O$
10 M $NH_4$–$NO_3$–0.2 M $HNO_3$: Dissolve 7 lbs. of $NH_4NO_3$ in $H_2O$, add 50 milliliters of concentrated $HNO_3$, and dilute to 4 liters with $H_2O$
4 M LiOH: Dissolve 671 grams of $LiOH \cdot H_2O$ in $H_2O$ and dilute to 4 liters
0.1 M HCl or pH 4 buffer for standardizing pH meter
Tri-n-butylphosphate (TBP)
0.5 M HDEHP: Dilute 645 grams of di-2-ethylhexyl orthophosphoric acid (94% purity) to 4 liters with n-heptane
Decanol
10 M HCl
0.05 M $HNO_3$
Te(IV) carrier: 10 mg. Te/ml. (added as $Na_2TeO_3$ in 6 M HCl)
Te(VI) carrier: 10 mg. Te/ml. (added as $Na_2TeO_4 \cdot 2H_2O$ in 3 M HCl)
$NH_2OH \cdot HCl$: solid
n-Heptane
EtOH-HCl: 20% absolute ethanol—80% concentrated HCl; saturated with HCl gas
Anion exchange resin: Bio-Rad Ag 1–X10, 100–200 mesh
Cation exchange resin: Bio-Rad Ag 50W–X4, minus 400 mesh ($H^+$ form)
Concentrated HCl—38 weight percent hydrogen chloride in an aqueous solution
Concentrated HF—48 weight percent hydrogen fluoride in an aqueous solution
Concentrated $NH_4OH$—30 weight percent ammonia in an aqueous solution
Concentrated $HClO_4$—71 weight percent perchloric acid in an aqueous solution.

We claim:

1. A method of separating tripositive actinide and lanthanide elements from solutions of irradiated earth samples comprising, (a) extracting the actinide and lanthanide elements from a 1.9 molar $Al(NO_3)_3$ aqueous solution into tributyl phosphate and back-extracting with water, (b) extracting these elements into 0.5 molar di-2-ethylhexyl phosphoric acid, esterifying this acid solution with decanol, and back-extracting the lanthanide and actinide elements with concentrated HCl, (c) passing a concentrated HCl solution of these elements through an anion exchange resin column, (d) precipitating hydroxides of these elements with 6 molar NaOH and with concentrated $NH_4OH$, dissolving said hydroxides in concentrated HCl, (e) separating the transcurium elements, americium-curium and the lanthanide elements by eluting from a cation resin exchange column with a solution of 20% absolute ethanol—80% concentrated HCl saturated with HCl gas.

References Cited

UNITED STATES PATENTS

| | | | |
|---|---|---|---|
| 2,683,655 | 7/1954 | Peppard et al. | 23—341 |
| 2,711,362 | 6/1955 | Street | 23—338 |
| 2,741,627 | 4/1956 | Thompson et al. | 23—338 |
| 2,859,095 | 11/1958 | Manning et al. | 23—338 |
| 2,887,358 | 5/1959 | Higgins et al. | 23—338 |
| 2,891,839 | 6/1959 | Hulet et al. | 23—338 |
| 2,925,431 | 2/1960 | Choppin et al. | 23—338 |
| 3,079,225 | 2/1963 | Baybarz et al. | 23—338 |
| 3,136,600 | 6/1964 | Adar et al. | 23—338 |
| 3,230,036 | 1/1966 | Kappelman et al. | 23—341 |

CARL D. QUARFORTH, *Primary Examiner.*

M. J. McGREAL, *Assistant Examiner.*